Patented July 11, 1933

1,917,421

UNITED STATES PATENT OFFICE

FRITZ BAUMANN, OF LEVERKUSEN-ON-THE-RHINE, GERMANY, ASSIGNOR TO GENERAL ANILINE WORKS, INC., OF NEW YORK, N. Y., A CORPORATION OF DELAWARE

NEW ANTHRAQUINONE COMPOUNDS

No Drawing. Application filed June 4, 1931, Serial No. 542,204, and in Germany June 4, 1930.

The present invention relates to new sulfonated compounds of the anthraquinone series and to the aluminium-, beryllium- and copper-lakes derived from said compounds.

I have found that new sulfonated compounds of the anthraquinone series corresponding to the probable formula

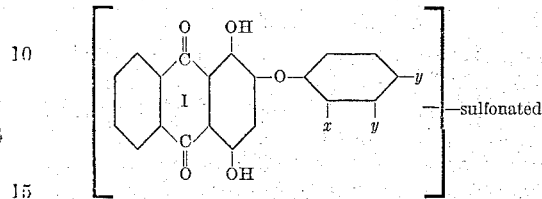

wherein $x$ means hydrogen or alkyl, one $y$ means hydrogen, alkyl, halogen, the carboxylic acid group, a carboxylic acid ester group or an acyl group ($CH_3$—CO—, $C_6H_5$—CO—, etc.), the other $y$ means hydrogen, are obtainable in the following manner:—

A 2-halogenquinizarine, such as 2-chloro- or 2-bromoquinizarine is caused to react with a phenolic compound of the probable formula

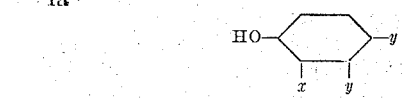

wherein the littera are to be declared as mentioned above, in the presence of an alkali, such as sodium- or potassium hydroxide, potassium- or sodium carbonate, etc. The reaction is performed while heating the reaction mixture, advantageously to a temperature between about 140 and about 200° C. Instead of the phenolic compound, an alkali metal salt of the same may be applied. In this case the reaction may be performed without the addition of an alkali.

A suitable solvent being inert to the starting materials may be added to the reaction mixture, but it is a preferred method of working to apply the phenolic compound in an amount sufficient to prevent the further addition of another solvent.

In some cases the reaction is favorably influenced by the addition of copper or suitable salts thereof, such as copper chloride, cuprous bromide, copper acetate, etc.

As phenolic compounds being operable in my process, there may be mentioned, by way of example, phenol, ortho-, meta- or para-cresol, ortho-, meta- or para-ethylphenols, meta-chlorophenol, meta-bromophenol, 4-chloro-2-methyl-phenol(1), para-hydroxybenzophenon, para-hydroxy-acetophenon, meta- or para- benzoic acid methyl- or ethyl ester, etc.

When working in the manner described above, there are obtained compounds of the probable formula

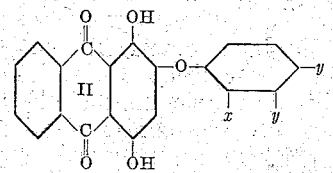

wherein the littera are to be explained as mentioned for the formula marked I. The new compounds are reddish-brown substances dissolving in concentrated sulfuric acid with a bluish-red coloration and in dilute alkalies with a blue coloration. They can be recrystallized from suitable organic solvents, such as glacial acetic acid, amyl alcohol, dichlorobenzene, etc.

The manner in which these compounds can be sulfonated depends to a far reaching extent on the chemical constitution of the compound in question. While, for example, the unsubstituted 2-phenoxyquinizarine is sulfonated in sulfuric acid monohydrate at room temperature, the para-cresol- or para-chlorophenol derivatives necessitate the use of fuming sulfuric acid of about 5–20% strength and of a temperature of about 30–70° C. The compounds obtained from para-hydroxybenzoic acid or the methyl- or ethyl esters thereof require even a temperature of 140–150° C. and the use of a fuming sulfuric acid of at least 30% strength. In other cases a mixture of sulfuric acid monohydrate and chlorosulfonic acid yields better results. Likewise the addition of boric acid will be useful in many cases.

I do not know up-to-date the exact chemical structure of the compounds thus obtainable, that is, the position of the sulfonic acid groups in the molecule. Depending on the substituents present in the benzene nucleus as well as on the more specific method of sulfonation one or two sulfonic acid groups may enter the molecule. It is to be presumed that at least one sulfonic acid group enters the benzene nucleus attached to the anthraquinone nucleus by means of oxygen. However, I am not aware, whether the second sulfonic acid group, in case it can be introduced into the molecule at all, likewise enters the benzene nucleus above mentioned or another nucleus.

When using in the claims the words "sulfonated compounds" they are intended to embrace the mono- and disulfonic acids obtainable by sulfonating a compound of the formula marked II.

The orange to brown colored sodium salts of the sulfonic acids obtainable according to the process described above, crystallize well, and dissolve in water with an orange to yellowish-brown coloration. They are distinguished by the fact that on treatment with metallic compounds suitable for lake formation, they yield hitherto unknown clear red pigment dyestuffs of very satisfactory fastness properties. There come into consideration for the lake formation compounds of metals such as beryllium, aluminium, copper and the like, in particular their hydroxides, carbonates etc. The lake formation is carried out in the known manner, for example, by dissolving the phenoxyquinizarine sulfonic acid in water and precipitating the lake by the addition of a metallic hydroxide, such as aluminium hydroxide, or by dissolving the sulfonic acid, from which the lake is to be produced in water in the presence of aluminium sulfate and precipitating the lake by means of sodium carbonate. After boiling for a short time, the pigment having separated is filtered, washed and dried.

The following examples illustrate my invention, without, however, limiting it thereto, the parts being by weight:—

*Example 1*

100 parts of pure para-cresol and 5.4 parts of a 30% aqueous caustic soda solution are heated to boiling for a short time to remove the water. 9.6 parts of 2-bromo-quinizarine (Berichte der deutschen chemischen Gesellschaft, vol. 33, page 1658) and 0.3 part of copper acetate are then added and the mixture is heated to boiling, until a test portion no longer shows a halogen reaction. After cooling to about 80° C. and diluting with 200 parts of methyl alcohol, the precipitated orange brown cresol derivative is filtered by suction at room temperature. If desired, dilute hydrochloric acid may be added to the methyl alcohol. After washing with methyl alcohol and water the precipitate is dried. For further purification the substance may be crystallized from glacial acetic acid. It dissolves in concentrated sulfuric acid with a bluish-red coloration and in dilute caustic soda solution with a blue coloration.

The sulfonation is carried out in 10 parts of fuming sulfuric acid of 5% strength at about 30° C. The sulfonic acid is isolated in the form of the sodium salt and can be used directly for lake formation. For this purpose 2 parts of the sulfonic acid are dissolved in 2000 parts of water, an aqueous suspension of beryllium hydroxide (produced from 40 parts of crystallized beryllium nitrate) is added to the boiling solution, and the reaction mixture is further heated to boiling, if desired with the addition of barium chloride, until the red beryllium lake has separated. The precipitate is filtered with suction while hot, washed with water and dried. Aluminium hydroxide or other fillers can be added to the red lake after precipitation.

*Example 2*

150 parts of para-chlorophenol, 10 parts of 30% caustic soda solution, 16 parts of 2-bromo-quinizarine and 0.5 part of copper acetate are heated to boiling for about 3 hours, until a test portion dissolved in sulfuric acid shows no further change. After cooling to about 90° C., 300 parts of methyl alcohol are stirred in, and the reaction product is isolated by filtering with suction. The compound thus obtained crystallizes from glacial acetic acid in long reddish-brown needles, melting at 185° C. Instead of the above mentioned bromoquinizarine, 2-chloroquinizarine can likewise be used.

On heating the new compound to 70° C. in 12 parts of fuming sulfuric acid of 20% strength, sulfonation occurs. When a test portion is completely soluble in water, the cooled melt is poured on to a mixture of ice and sodium chloride. The sodium salt, which separates, is filtered with suction and washed several times with dilute sodium chloride solution. The solution of the sulfonic acid in dilute caustic soda solution shows a violet coloration, that in concentrated sulfuric acid a bluish-red coloration.

The aluminium lake is obtained by dissolving 10 parts of the sulfonic acid in 4000 parts of water, adding 2000 parts of a 10% aluminium sulfate solution and 840 parts of a 10% aqueous sodium carbonate solution. The precipitation is complete after boiling of the reaction mixture for a short time. The pigment is isolated by filtering with suction, and dried after washing.

A pigment of a similar kind can be obtained from the sulfonic acid of the corresponding para-cresol compound.

*Example 3*

40 parts of para-hydroxybenzoic acid methylester, 1.6 parts of sodium methylate and 6.4 parts of 2-bromoquinizarine are stirred together at 180–185° C. The reaction proceeds fairly quickly and in a test portion taken out after one hour, no unchanged bromoquinizarine can be detected anymore. When the reaction is complete, the excess of hydroxy-benzoic acid ester is dissolved out with methyl alcohol after cooling of the reaction mixture. After working up in the customary manner, the reaction product obtained can be crystallized from glacial acetic acid and is thus obtained in form of small orange tablets melting at 170° C.

When caustic soda solution is added to the ester in pyridine water, the ester is saponified to the carboxylic acid and can then be used directly for lake formation.

*Sulfonation.*—The hydroxybenzoic acid ester derivative is sulfonated in the presence of boric acid with fuming sulfuric acid of 30% strength at 140–150° C. The sulfonic acid thus obtained forms an orange sodium salt, which crystallizes well and dissolves in dilute alkali with a violet coloration and in concentrated sulfuric acid with a red coloration.

*Lake formation.*—5 parts of the above sulfonic cid are dissolved in 2000 parts of water, 250 parts of a 10% aluminium hydroxide paste are added, and the whole is heated to boiling for some time, until precipitation of the aluminium lake is complete. The working up is carried out in the customary manner. The lake yields clear red paintings of very satisfactory fastness to light.

Example 4.

15 parts of 2-bromoquinizarine, 7.5 parts of sodium phenolate and 0.4 part of copper acetate are stirred into 150 parts of phenol, while heating the reaction mixture to boiling. The first violet colored thick melt gradually becomes orange colored and mobile. As soon as unchanged starting material can no longer be detected, the mixture is cooled and, at a temperature of 70° C., diluted with 300 parts of methanol. The 2-phenoxyquinizarine, which separates in clear orange colored needles, is filtered by suction at room temperature, washed and dried. It crystallizes from glacial acetic acid or para-chlorotoluene in oranged colored needles, melting at 209–211° C.

*Sulfonation.*—(*a*) 2 - phenoxyquinizarine is sulfonated by dissolving it in ten times the quantity of sulfuric acid, which contains about 2% of free $SO_3$. Isolation of the monosulfonic acid formed is effected in the usual manner in form of its orange-red sodium salt. The solution of the sulfonic acid in strong sulfuric acid is bluish-red.

(*b*) 10 parts of 2-phenoxyquinizarine and 4 parts of crystallized boric acid are heated to 80° C. in 80 parts of fuming sulfuric acid of 20% strength, until solution is complete. 80 parts of fuming sulfuric acid of 30% strength are added while raising the temperature to 135–140° C. The sulfonation is interrupted, as soon as a worked up test portion dissolves in sulfuric acid with a yellowish-red coloration.

The reaction mixture is then poured into ice water, a small amount of bisulfite is added and salting out of the disulfonic acid is effected by the addition of potassium chloride. The potassium salt assumes a crystalline structure when heated to a temperature of 60–70° C. After cooling, the orange red crystals are filtered with suction and dried after repeated washing with a solution of potassium chloride.

The pure potassium salt contains 10.8% of sulfur; calculated for the disulfonic acid 11.3% of sulfur.

*Lake formation.*—When the sulfonic acids obtainable according to (*a*) and (*b*) are converted into their aluminium lakes according to the method described in Example 3, valuable bluish-red lakes are obtained.

I claim:—

1. The new compounds having in the free form the general formula:—

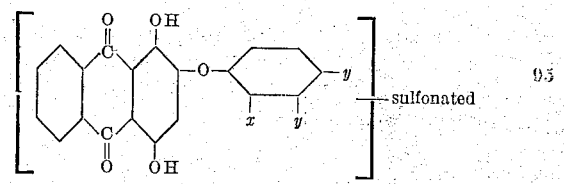

wherein $x$ stands for hydrogen or alkyl, one $y$ means hydrogen, alkyl, halogen, the carboxylic acid group, a carboxylic acid ester group or an acyl group, the other $y$ means hydrogen, said compounds being in form of their sodium salts orange to brown crystals, dissolving in water with an orange to yellowish-brown coloration.

2. The new compounds having in the free form the probable formula:—

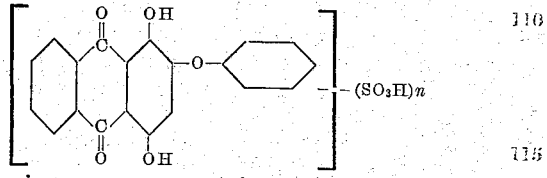

wherein $n$ means one of the numbers one or two, said compounds being in form of their alkali metal salts orange red crystals, dissolving in strong sulfuric acid with a yellowish-red to bluish-red coloration.

3. In the process of preparing sulfonated compounds of the anthraquinone series, the step which comprises heating a 2-halogen quinizarine with a compound of the probable formula:—

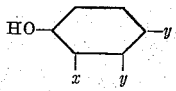

wherein $x$ stands for hydrogen or alkyl, one $y$ means hydrogen, alkyl, halogen, the carboxylic acid group, a carboxylic acid ester group or an acyl group, the other $y$ means hydrogen, in the presence of an alkali.

4. In the process of preparing sulfonated compounds of the anthraquinone series the step which comprises reacting upon a compound of the probable formula:—

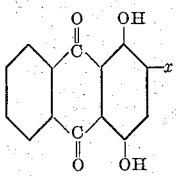

wherein $x$ means chlorine or bromine, with a compound of the probable formula:—

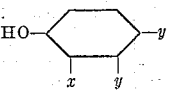

wherein $x$ stands for hydrogen or alkyl, one $y$ means hydrogen, alkyl, halogen, the carboxylic acid group, a carboxylic acid ester group or an acyl group, the other $y$ means hydrogen, in the presence of an alkali, at a temperature of between about 140 and about 200° C.

5. In the process of preparing a sulfonated 2-phenoxyquinizarine, the step which comprises reacting upon a compound of the probable formula:—

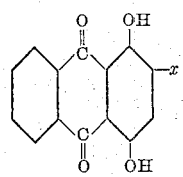

wherein $x$ means chlorine or bromine, with phenol, in the presence of an alkali at a temperature between about 140 and about 200° C.

6. In the process of preparing a sulfonated 2-phenoxyquinizarine the step which comprises reacting upon 15 parts by weight of 2-bromoquinizarine with 7,5 parts by weight of sodium phenolate and 0,4 part by weight of copper acetate, in the presence of 150 parts by weight of phenol at the boiling point of the reaction mixture.

7. The process which comprises heating a 2-halogenquinizarine with a compound of the probable formula:—

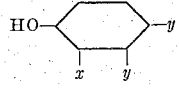

wherein $x$ stands for hydrogen or alkyl, one $y$ means hydrogen, alkyl, halogen, the carboxylic acid group, a carboxylic acid ester group or an acyl group, the other $y$ means hydrogen, in the presence of an alkali and sulfonating the reaction product thus obtained.

8. The process which comprises heating a compound of the probable formula:—

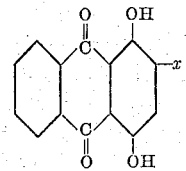

wherein $x$ means chlorine or bromine, with a compound of the probable formula:

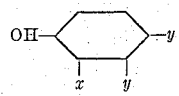

wherein $x$ stands for hydrogen or alkyl, one $y$ means hydrogen, alkyl, halogen, the carboxylic acid group, a carboxylic acid ester group or an acyl group, the other $y$ means hydrogen, in the presence of an alkali, at a temperature of between about 140 and about 200° C., and sulfonating the reaction product thus obtained.

9. The process which comprises heating a compound of the probable formula:

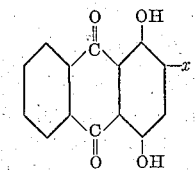

wherein $x$ means chlorine or bromine, with phenol in the presence of an alkali at a temperature between about 140 and about 200° C. and sulfonating the reaction product thus obtained.

10. The process which comprises reacting upon 15 parts by weight of 2-bromoquinizarine with 7.5 parts by weight of sodium phenolate and 0.4 parts by weight of copper acetate in the presence of 150 parts by weight of phenol at the boiling point of the reaction mixture, and sulfonating the reaction product thus obtained.

In testimony whereof, I affix my signature.

FRITZ BAUMANN.